United States Patent
Koivusalmi et al.

(10) Patent No.: US 8,143,469 B2
(45) Date of Patent: Mar. 27, 2012

(54) PROCESS FOR PRODUCING BRANCHED HYDROCARBONS

(75) Inventors: Eija Koivusalmi, Kulloonkylä (FI); Rami Piilola, Helsinki (FI); Pekka Aalto, Porvoo (FI)

(73) Assignee: Neste Oil Oyj, Espoo (FI)

( * ) Notice: Subject to any disclaimer, the term of this patent is extended or adjusted under 35 U.S.C. 154(b) by 801 days.

(21) Appl. No.: 12/155,817

(22) Filed: Jun. 10, 2008

(65) Prior Publication Data

US 2008/0302001 A1    Dec. 11, 2008

Related U.S. Application Data

(60) Provisional application No. 60/943,132, filed on Jun. 11, 2007.

(51) Int. Cl.
*C07C 1/32* (2006.01)
(52) U.S. Cl. .......... 585/733; 585/14; 585/240; 585/242; 585/331; 585/332; 208/15; 208/64; 208/133; 208/142
(58) Field of Classification Search .................. 585/240, 585/733, 14, 242, 331, 332; 208/15, 64, 208/133, 142
See application file for complete search history.

(56) References Cited

U.S. PATENT DOCUMENTS

| | | | |
|---|---|---|---|
| 2,585,723 A * | 2/1952 | Banes et al. | 562/606 |
| 4,086,188 A * | 4/1978 | Reichle | 502/342 |
| 4,678,860 A | 7/1987 | Kuester | |
| 4,705,907 A | 11/1987 | Inui | |
| 5,705,722 A | 1/1998 | Monnier et al. | |
| 5,777,183 A * | 7/1998 | Mueller et al. | 568/905 |
| 7,087,152 B2 | 8/2006 | Cody et al. | |
| 2004/0230085 A1 | 11/2004 | Jakkula et al. | |
| 2006/0207166 A1* | 9/2006 | Herskowitz et al. | 44/385 |
| 2006/0264684 A1 | 11/2006 | Petri et al. | |
| 2007/0287873 A1 | 12/2007 | Coupard et al. | |

FOREIGN PATENT DOCUMENTS

| | | |
|---|---|---|
| EP | 0 457 665 A1 | 11/1991 |
| EP | 1 681 337 A1 | 7/2006 |
| EP | 1 862 528 A1 | 12/2007 |
| FI | 100248 B | 10/1997 |
| WO | WO-98/56876 A1 | 12/1998 |
| WO | WO-2004/033587 A2 | 4/2004 |
| WO | WO-2004/080590 A1 | 9/2004 |
| WO | WO-2006/100584 A2 | 9/2006 |

OTHER PUBLICATIONS

Laurent, et al., "Study of the Hydrodeoxygenation of Carbonyl, Carboxylic, and Guaiacyl Groups over Sulfided CoMo/γ-Al2O3 and NiMo/ γ-Al2O3 Catalyst. II. Influence of Water, Ammonia, and Hydrogen Sulfide," in Applied Catalysis A: General 109 (1994), 97-115.*

(Continued)

*Primary Examiner* — In Suk Bullock
*Assistant Examiner* — Bradley Etherton
(74) *Attorney, Agent, or Firm* — Birch, Stewart, Kolasch & Birch, LLP

(57) ABSTRACT

The invention relates to a process for producing saturated C5-C28 hydrocarbons, suitable as diesel fuels, kerosenes and gasolines, comprising the steps where feedstock derived from starting material of biological origin, is subjected to a condensation step and subsequently subjected to a combined hydrodefunctionalization and isomerization step.

17 Claims, 1 Drawing Sheet

OTHER PUBLICATIONS

Klimkiewicz, et al., "Ketonization of Fatty Methyl Esters over Sn-Ce-Rh-O Catalysts" in JAOCS, vol. 78, No. 5, (2001).*

Barker, et al., "Petroleum" in Kirk-Othmer Encyclopedia of Chemical Technology, J. Wiley & Sons, available on-line May 13, 2005.*

Thomas, et al., "Fats and Fatty Oils" in Ullmann's Encyclopedia of Industrial Chemistry, 2005, Wiley-VCH, available on-line Jun. 15, 2000.*

Kenneally, "Alcohols, Higher Aliphatic, Survey" in Kirk-Othmer Encyclopedia of Chemical Technology, 2001, J. Wiley & Sons, available on-line Jun. 4, 2001.*

Kelly et al., "Waste elimination in condensation reactions of industrial importance," Green Chemistry, vol. 4, 2002, pp. 392-399.

Durand et al., "Heterogenous Hydrodeoxygenation of Ketones and Alcohols on Sulfided $NiO\text{-}MoO_{3/\gamma}\text{-}Al_2O_3$ Catalyst," Journal of Catalysis, vol. 90, 1984, pp. 147-149.

* cited by examiner

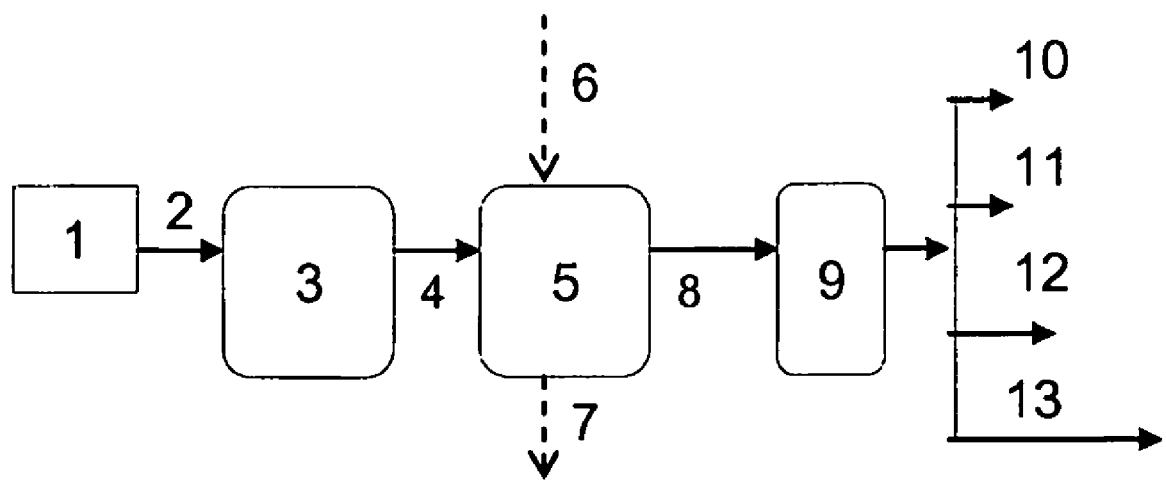

PROCESS FOR PRODUCING BRANCHED HYDROCARBONS

This Nonprovisional application claims priority under 35 U.S.C. §119(e) on U.S. Provisional Application No(s). 60/943,132 filed on Jun. 11, 2007, the entire contents of which are hereby incorporated by reference.

FIELD OF INVENTION

The invention relates to a process for the manufacture of branched saturated hydrocarbons from renewable sources and particularly to a process for the manufacture of hydrocarbons suitable for diesel fuel, kerosene or gasoline pool. The process comprises steps wherein a feedstock of biological origin is condensed and then subjected to a combined catalytic hydrodefunctionalization and isomerization step.

STATE OF THE ART

Fatty acids are used as raw materials in various applications in the chemical industry and typically in the manufacture of products ranging from lubricants, polymers, fuels and solvents to cosmetics. Fatty acids are generally obtained from wood pulping processes or by hydrolysis of triglycerides of plant or animal origin. Naturally occurring triglycerides are usually esters of glycerol and straight chain, even numbered carboxylic acids having 4-26 carbon atoms. Most common fatty acids contain 16, 18, 20 or 22 carbon atoms, but there is also lot of triglycerides with C4-C14 fatty acids. In addition, formic acid (C1) and acetic acids (C2) are naturally occurring carboxylic acids.

Fatty acids may either be saturated or they may contain one or more unsaturated bonds. Unsaturated fatty acids are often olefinic having carbon-carbon double bonds with cis-configuration. The unsaturated centers appear in preferred positions in the carbon chain. The most common position is ω9, like in oleic acid (C18:1) and erucic acid (C22:1). Polyunsaturated acids generally have a methylene interrupted arrangement of cis-olefinic double bonds. Saturated long straight chain fatty acids (C10:0 and higher) are solid at room temperature, which makes their processing and use difficult in a number of applications. Unsaturated long chain fatty acids like oleic acid are easily processable liquids at room temperature, but unstable due to double bonds. Branched fatty acids mimic the properties of straight chain unsaturated fatty acids in many respects, but they are more stable. For example branched C18:0 fatty acid, known as isostearic acid, is liquid at room temperature, but it is not as unstable as C18:1 acid, since the unsaturated bonds are absent in branched C18:0. Therefore, branched fatty acids are more desirable for many applications than straight chain fatty acids.

Raw materials comprising fatty acid containing biocompounds are used in certain processes for the production of fuels. Diesel fuels based on biological material are generally referred to as biodiesel. A definition for "biodiesel" is provided in Original Equipment Manufacturer (OEM) guidelines as follows: Biodiesel is mono-alkyl esters of long chain fatty acids derived from plant oils or animal fats, which conform to ASTM D6751 or EN 14214 specification for use in diesel engines as described in following Table 1. Biodiesel refers to pure fuel before blending with conventional diesel fuel (B100).

TABLE 1

Specifications for Biodiesel (B100, 100%)

| Property | ASTM D6751 | EN 14214 | Unit |
|---|---|---|---|
| Density at 15° C. | | 860-900 | kg/m³ |
| Flash point (closed cup) | 130 | ≧120 | ° C. |
| Water and sediment | ≦0.050 | ≦0.050 | % |
| Kinematic viscosity 40° C. | 1.9-6.0 | 3.5-5.0 | mm²/s |
| Sulfated ash | ≦0.020 | ≦0.020 | wt. % |
| Sulfur | ≦0.05 | ≦0.001 | wt. % |
| Cetane number | ≧47 | ≧51 | |
| Carbon residue | ≦0.050 | | wt. % |
| Carbon residue 10% dist bottom | | ≦0.3 | wt. % |
| Acid number | ≦0.80 | ≦0.5 | mg KOH/g |
| Free glycerol | ≦0.020 | ≦0.02 | wt. % |
| Total glycerol | ≦0.240 | ≦0.25 | wt. % |
| Phosphorus content | ≦0.001 | ≦0.001 | wt. % |

High cetane number, proper viscosity range and good low-temperature properties are required for high quality diesel fuel.

Besides biodiesel there are also following biofuels available:

a) BioEthanol: ethanol produced from biomass and/or the biodegradable fraction of waste, to be used as biofuel;
b) BioDiesel: methyl ester produced from vegetable or animal oil, of diesel quality, to be used as biofuel;
c) BioGas: fuel gas produced from biomass and/or from the biodegradable fraction of waste, that can be purified to natural gas quality, to be used as biofuel, or wood gas;
d) BioMethanol: methanol produced from biomass, to be used as biofuel;
e) BioDimethylether: dimethyl ether produced from biomass, to be used as biofuel;
f) BioETBE (Ethyl Tertiary Butyl Ether): ETBE produced on the basis of bioethanol. The percentage of BioETBE, calculated as biofuel, is 47% v/v;
g) BioMTBE (Methyl Tertiary Butyl Ether): fuel component produced on the basis of biomethanol. The percentage of BioMTBE, calculated as biofuel, is 36% v/v;
h) Synthetic biofuels: synthetic hydrocarbons or mixtures of synthetic hydrocarbons, produced from biomass;
i) Biohydrogen: hydrogen produced from biomass, and/or from the biodegradable fraction of waste, to be used as biofuel;
j) Pure vegetable oil: oil produced from oil plants through pressing, extraction or comparable procedures, crude or refined but chemically unmodified, when compatible with the type of engines involved and the corresponding emission requirements.

In addition to those listed there exists BioTAME (Tertiary Amyl Methyl Ether) produced on the basis of bioethanol. The percentage of BioTAME, calculated as biofuel, is 31% v/v.

Due to the nonpolluting and renewable nature of biofuels, the European Union directive 2003/30/EC promotes the use of biofuels or other renewable fuels. The directive has set a minimum percentage of biofuels to replace diesel or gasoline for transport purposes so, that by the end of 2010 there should be a 5.75% minimum proportion of biofuels in all gasoline and diesel fuels sold.

The Clean Air Act requires the addition of oxygenates to reduce carbon monoxide emissions in the United States. Oxygenates are commonly alcohols and ethers which, when added to gasoline, increase the amount of oxygen in that gasoline blend. Common ethers in use as oxygenates include ETBE (Ethyl Tertiary Butyl Ether), MTBE (Methyl Tertiary Butyl Ether) and TAME (Tertiary Amyl Methyl Ether). Common alcohols are methanol and ethanol. Oxygenate ethers improve the solubility of ethanol to gasoline.

Ethanol can be produced in different ways, using a variety of feedstocks. Bioethanol is obtained from the conversion of hydrocarbon based renewable agricultural feedstocks, such as sugarcane and corn; or from feedstocks from wood pulping. Biomethanol can be produced from synthesis gas, derived from biomass feedstocks in Fischer-Tropsch synthesis. Another biosource for methanol production is glycerol, a byproduct of biodiesel production. Synthetic biofuels can be produced from biomass by pyrolysis and by Fischer-Tropsch process; or alternatively, from triglycerides by processes which mimic traditional mineral crude oil refining processes.

Biomethanol is most suitable for application as a petrol substitute in spark ignition engines due to its high octane rating. Just like in the case of bioethanol, the lower vapor pressure, the lower volumetric energy density (about half of that of petrol) and the incompatibility with engine materials should be taken into account when applying it as an automotive fuel. Biomethanol can be blended up to 10-20% with petrol without the need for engine or infrastructure modifications. However, additional safety measures need to be taken for handling of methanol since pure methanol burns with an invisible flame, unlike ethanol. Moreover, because methanol is poisonous, contact with skin and eyes should be avoided.

Ethanol fuel can be combined with gasoline in any concentration up to pure ethanol (E100). Anhydrous ethanol with at most 1% water content can be blended with gasoline in varying quantities to reduce consumption of petroleum fuels. Worldwide automotive ethanol capabilities vary widely and most spark-ignited gasoline style engines will operate well with mixtures of 10% ethanol (E10). At a 10% mixture, ethanol reduces the likelihood of engine knock, by raising the octane rating. Most common ethanol fuel composition is Europe is E85, with 85% ethanol and 15% gasoline.

Another gasoline blending components are alkylates. Alkylate is a branched paraffin compound (i-paraffin) formed by the catalytic reaction of isobutane with light olefins, such as ethylene, propylene, butylene, and amylene (pentylene), the carbon number is thus C6-C9. Alkylate is a desirable gasoline blending component due to its high octane and relatively low volatility properties.

Biodiesel is an alternative fuel, produced from renewable sources and it contains no petroleum. It can be blended in minor amounts with petroleum diesel to create a biodiesel blend, further it is non-toxic and essentially free of sulfur and aromatics. It can be used in compression-ignition (diesel) engines with little or no modifications.

Sulphur free fuels are required in order to gain the full effect of new and efficient anti-pollution technologies in modern vehicles and to cut emissions of nitrogen oxides, volatile hydrocarbons and particles, as well as to achieve direct reduction of sulphur dioxide in exhaust gases. The European Union has decreed that these products must be available to the market from 2005 and must be the only form on sale from 2009. This new requirement will reduce annual sulphur emissions from automotive fuels.

Starting materials originating from biological sources contain usually high amounts of oxygen, and as examples of oxygen containing compounds fatty acids, fatty acid esters, aldehydes, primary alcohols and their derivatives can be mentioned.

EP 457,665 discloses a method for producing ketones from triglycerides, fatty acids, fatty acid esters, fatty acid salts, and fatty acid anhydrides using a bauxite catalyst containing iron oxide. A process for condensing alcohols using alkali metal or alkaline earth metal hydroxides with metal oxide cocatalyst to give Guerbet alcohols is disclosed in U.S. Pat. No. 5,777,183. Basic homogeneous catalysts such as NaOH and $Ca(OH)_2$ and supported alkali metals like $Na/SiO_2$ may be mentioned as heterogeneous catalysts for condensing aldehydes, as described by Kelly, G. J. et al., *Green Chemistry*, 2002, 4, 392-399.

Acid stable aldehydes or ketones can be reduced to corresponding hydrocarbons by the Clemmensen reduction. A mixture of amalgamated zinc and hydrochloric acid is used as deoxygenation catalyst.

However, the above described strongly acidic amalgam catalyst system is not suitable for hydrocarbon fuel production on an industrial scale. In addition to strong acidity and batch process there are potential uncontrollable side reactions such as alkylation, cracking and isomerization.

Durand, R. et al., *Journal of Catalysis* 90(1) (1984), 147-149 describe hydrodeoxygenation of ketones and alcohols on sulphided $NiO-MoO_3/\gamma-Al_2O_3$ catalyst to produce corresponding paraffins. These hydrodesulphurization catalysts may also be applied to hydrodeoxygenation processes of molecules based on biological starting materials, to produce fuel range paraffins. In U.S. Pat. No. 5,705,722 a process is described for producing additives for diesel fuels from biomass feedstock such as tall oil, wood oils, animal fats and blends of tall oil with plant oil under in the presence of a CoMo or NiMo catalyst to obtain a product mixture.

In hydrodeoxygenation processes conventional hydroprocessing catalysts are used, particularly NiMo and CoMo based catalysts, which are needed to be maintained in their sulphided form in order to be active at process conditions, and therefore a small $H_2S$ co-feed is commonly added. However, as there is a general need to decrease the use sulphur, particularly because of environmental reasons, these catalysts are not desired. Further, the products obtained in the above mentioned processes are essentially n-paraffins solidifying at sub-zero temperatures and as such they are unsuitable for high quality diesel fuels, kerosene and gasoline compounds.

FI 100248 describes a two-step process for producing middle distillate from plant oil by hydrogenating fatty acids or triglycerides of plant oil using commercial sulphur removal catalysts (NiMo and CoMo) to give n-paraffins, followed by isomerising said n-paraffins using metal containing molecule sieves or zeolites to obtain branched-chain paraffins. The hydrotreating was carried out at reaction temperatures of 330-450° C.

Dewaxing catalysts with hydroisomerization function are generally thought to be intolerant of heteroatom contaminants, and typically sulphur demanding hydrotreating step is employed before dewaxing in order to remove heteroatom contaminants from the feed, because said contaminants are thought to result in accelerated catalyst deactivation. However, in WO 2006/100584 a process for production of diesel fuel from plant oils and animal fats is disclosed comprising hydrodeoxygenating and hydroisomerizing the feed oil in a single step.

In U.S. Pat. No. 7,087,152 a process is disclosed where oxygenate containing waxy mineral hydrocarbon feed or Fischer-Tropsch wax is dewaxed using a dewaxing catalyst, which is selectively activated by the oxygenate added to feed. EP 1,549,725 relates to an integrated catalytic hydrodewaxing process of hydrocarbon feedstock containing sulphur and nitrogen contaminants, including hydrotreating, hydrodewaxing (hydroisomerisation) and/or hydrofinishing without disengagement between the process steps.

Although methods for processing of products of biological origin are well known in the art, there is still a need for a new process, utilizing renewable feedstock for producing hydrocarbons suitable as bio fuels.

OBJECTS OF THE INVENTION

An object of the invention is a process for producing branched saturated hydrocarbons.

Another object of the invention is a process for producing saturated diesel fuels, kerosenes and gasolines.

Still another object of the invention is a process for producing saturated diesel fuels, kerosenes and gasolines using starting materials of biological origin.

Still another object of the invention is a process for producing diesel fuels, kerosenes and gasolines, wherein feedstock derived from biological starting material is condensed, followed by a combined hydrodefunctionalization and isomerization step.

DEFINITIONS

Carboxylic acids and derivatives thereof include fatty acids and derivatives thereof. Carbon number of fatty acids and their derivatives is at least C1, and after condensation reaction the chain length of the reaction product is at least 5 carbons, carbon number being C5.

Carboxylic acids marked for example C18:1 refer here to C18 chain with one double bond.

The term "saturated hydrocarbon", used herein refers to paraffinic and naphthenic compounds, but not to aromatics. Paraffinic compounds may either be linear (n-paraffins) or branched (i-paraffins).

Saturated diesel fuels, kerosenes and gasolines comprise here saturated hydrocarbons.

Naphthenic compounds are cyclic saturated hydrocarbons, i.e. cycloparaffins. Such hydrocarbons with cyclic structure are typically derived from cyclopentane or cyclohexane. A naphthenic compound may comprise a single ring structure (mononaphthene) or two isolated ring structures (isolated dinaphthene), or two fused ring structures (fused dinaphthene) or three or more fused ring structures (polycyclic naphthenes or polynaphthenes).

Condensation refers here to a reaction wherein two feedstock molecules combine to form a larger molecule. In the condensation the carbon chains of the feedstock molecules are lengthened to the level necessary for the diesel fuels, kerosenes and gasolines, typically to hydrocarbon chain lengths of at least C5.

Deoxygenation or hydrodeoxygenation (HDO) refers here to removal of oxygen by means of hydrogen. Water is liberated in the reaction. The structure of the biological starting material is converted to either paraffinic or olefinic, according to the catalyst and reaction conditions used.

Hydrodefunctionalization (HDF) refers here to removal of oxygen, nitrogen and sulphur atoms by means of hydrogen. The HDF step converts oxygen, nitrogen and sulphur containing contaminants to water, ammonia and hydrogen sulphide respectively.

Isomerization refers here to hydroisomerization of linear hydrocarbons (n-paraffins) resulting in a branched structure (i-paraffins).

Combined hydrodefunctionalization and isomerization step (CHI) refers here to removal of oxygen, nitrogen and sulphur atoms by means of hydrogen and isomerizing wax molecules to branched isomerates (hydrocarbons).

In this context, pressures are gauge pressures relative to normal atmospheric pressure.

Classification of the periodic table of the elements is the IUPAC Periodic Table format having Groups from 1 to 18.

In this context, width of carbon number range refers to the difference of the carbon numbers of the largest and the smallest molecules plus one, measured from the main peak in FIMS analysis of the product.

SUMMARY OF THE INVENTION

In the process according to the invention for the manufacture of branched saturated hydrocarbons and particularly high quality diesel fuels, kerosenes and gasolines, a feedstock is subjected to condensation, yielding a condensed product comprising hydrocarbons containing one or more heteroatoms selected from oxygen, sulphur and nitrogen, and the condensed product is then subjected to a combined hydrodefunctionalization and isomerization step (CHI), whereby simultaneously isomerization takes place and heteroatoms are removed in one single catalytic process step. The obtained diesel fuels, kerosenes and gasolines can be mixed in conventional fuels without any blending limitations and they fulfill the highest technical requirements without extensive use of additives.

The invention is illustrated with the appended FIG. 1 without wishing to limit the scope of the invention to the embodiments of said FIGURE.

In FIG. 1 a preferable embodiment of the invention is shown schematically. In the process the condensation step is carried out prior to the combined hydrodefunctionalization and isomerization step. From the feed tank 1, heteroatoms containing feedstock stream 2 is passed to condensation reactor 3, followed by passing of the condensed stream 4 to a combined hydrodefunctionalization and isomerization reactor 5, together with hydrogen gas 6. Excess of hydrogen and hydrogenated heteroatoms are removed as gaseous stream 7. The obtained branched paraffinic stream 8 is passed to distillation and/or separation unit 9, where product components boiling at different temperature ranges, gases 10, gasoline 11, kerosene 12 and diesel 13 are separated.

The distillation cuts of different fractions may vary.

Typically gases comprise C1-C8 hydrocarbons boiling in the range of −162-36° C., gasoline comprises C5-C10 hydrocarbons boiling in the range of 36-174° C., kerosene comprises C9-C14 hydrocarbons boiling in the range of 151-254° C. and diesel comprises C12-C28 hydrocarbons boiling in the range of 216-431° C.

However, the boiling ranges are those determined for n-paraffins with said carbon number. Boiling points of the isomerized compounds are naturally lower.

DETAILED DESCRIPTION OF THE INVENTION

It was surprisingly found that high quality branched saturated hydrocarbons and particularly diesel fuels, kerosenes and gasolines can be obtained by a process wherein feedstock is condensed and subsequently subjected to combined hydrodeoxygenation and isomerization step. The hydrodeoxygenation and isomerization reactions can be successfully performed simultaneously in the same reactor in the presence of hydrogen and a catalyst having both an acidic function and a hydrogenation function. The catalyst typically comprises a combination of molecular sieve and metal.

Feedstock to Condensation

The feedstock of the condensation step is suitably material derived from starting material of biological origin. The feedstock is selected from ketones, aldehydes, alcohols, carboxylic acids, esters of carboxylic acids and anhydrides of carboxylic acids, alpha olefins produced from carboxylic acids, metal salts of carboxylic acids, and corresponding sulphur compounds, corresponding nitrogen compounds and combinations thereof, originating from biological starting material. The selection of the feedstock depends on the type of the condensation reaction used.

The feedstock may have a total carbon number ranging from 1 to 26 (having boiling point at 412° C.), preferably from 1 to 20 and particularly preferably from 1 to 14.

Preferably the feedstock is selected from fatty acid esters, fatty acid anhydrides, fatty alcohols, fatty ketones, fatty aldehydes, natural waxes, and metal salts of fatty acids. In the condensation step, also di- or multifunctional feedstocks such as dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds and combinations thereof may be used.

The feedstock originating from starting material of biological origin, called biological starting material in this description is selected from the group consisting of:
a) plant fats, plant oils, plant waxes; animal fats, animal oils, animal waxes; fish fats, fish oils, fish waxes, and
b) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis, and
c) esters obtained from plant fats, plant oils, plant waxes; animal fats, animal oils, animal waxes; fish fats, fish oils, fish waxes, and mixtures thereof by transesterification, and
d) metal salts of fatty acids obtained from plant fats, plant oils, plant waxes; animal fats, animal oils, animal waxes; fish fats, fish oils, fish waxes, and mixtures thereof by saponification, and
e) anhydrides of fatty acids from plant fats, plant oils, plant waxes; animal fats, animal oils, animal waxes; fish fats, fish oils, fish waxes, and mixtures thereof, and
f) esters obtained by esterification of free fatty acids of plant, animal and fish origin with alcohols, and
g) fatty alcohols or aldehydes obtained as reduction products of fatty acids from plant fats, plant oils, plant waxes; animal fats, animal oils, animal waxes; fish fats, fish oils, fish waxes, and mixtures thereof, and
h) recycled food grade fats and oils, and fats, oils and waxes obtained by genetic engineering, and
i) mixtures of said starting materials.

Biological starting materials also include corresponding compounds derived from algae, bacteria and insects as well as starting materials derived from aldehydes and ketones prepared from carbohydrates.

Examples of suitable biological starting materials include fish oils such as Baltic herring oil, salmon oil, herring oil, tuna oil, anchovy oil, sardine oil, and mackerel oil; plant oils such as rapeseed oil, colza oil, canola oil, tall oil, sunflower seed oil, soybean oil, corn oil, hemp oil, olive oil, cottonseed oil, linen seed oil, mustard oil, palm oil, peanut oil, castor oil, jatropha seed oil, Pongamia pinnata seed oil, palm kernel oil, and coconut oil; and moreover, suitable are also animal fats such as butter, lard, tallow, and also waste and recycled food grade fats and oils, as well as fats, waxes and oils produced by genetic engineering. In addition to fats and oils, suitable starting materials of biological origin include animal waxes such as bee wax, Chinese wax (insect wax), shellac wax, and lanoline (wool wax), as well as plant waxes such as carnauba palm wax, Ouricouri palm wax, jojoba seed oil, candelilla wax, esparto wax, Japan wax, and rice bran oil. Especially suitable biological starting materials include those, which have a high proportion of short chain fatty acids, such as corn oil, olive oil, peanut oil, palm kernel oil, coconut oil butter, lard and tallow.

The biological starting material may also contain free fatty acids and/or fatty acid esters and/or metal salts thereof. Said metal salts are typically alkali earth metal or alkali metal salts.

Condensation

In the condensation step the feedstock comprising compounds having carbon number of at least C1 is processed to monofunctional or multifunctional products having carbon number from C5 to C28.

Suitable condensation reactions are based on the functionality of the feed molecules, being decarboxylative condensation (ketonization), aldol condensation, alcohol condensation (Guerbet reaction), and radical reactions based on alpha-olefin double bonds and weak alpha-hydrogen functionality. The condensation reaction step is preferably selected from ketonization, aldol condensation, alcohol condensation and radical reactions. Suitable condensation reactions are described more in detail in the following.

Decarboxylative Condensation (Ketonization)

In the ketonization reaction the functional groups, typically the acid groups of fatty acids contained in the feedstock react with each other giving ketones having carbon number of at least C5. The ketonization may also be carried out with feedstock comprising fatty acid esters, fatty acid anhydrides, fatty alcohols, fatty aldehydes, natural waxes, and metal salts of fatty acids. In the ketonization step, also dicarboxylic acids or polyols including diols, may be used as additional starting material allowing longer chain lengthening than with fatty acids only. In said case, a polyketonic molecule is obtained. In the ketonization reaction, the pressure ranges from 0 to 10 MPa, preferably from 0.1 to 5 MPa, particularly preferably from 0.1 to 1 MPa, whereas the temperature ranges between 10 and 500° C., preferably between 100 and 400° C., particularly preferably between 300 and 400° C., the feed flow rate WHSV being from 0.1 to 10 l/h, preferably from 0.3 to 5 l/h, particularly preferably from 0.3 to 3 l/h. In the ketonization step metal oxide catalysts, which are optionally supported, may be used. Typical metals include Na, Mg, K, Ca, Sc, Cr, Mn, Fe, Co, Ni, Cu, Zn, Sr, Y, Zr, Mo, Rh, Cd, Sn, La, Pb, Bi, and rare earth metals. The support is typically laterite, bauxite, titanium dioxide, silica and/or aluminium oxide. The metal is preferably molybdenum, manganese, magnesium, iron and/or cadmium, the support being silica and/or alumina. Particularly preferably the metal is molybdenum, manganese and/or magnesium as oxide in a catalyst without support. No special catalysts are needed for the ketonization of metal salts of fatty acids (soaps), since the metal present in the soap promotes the ketonization reaction.

Aldol Condensation

In the aldol condensation reaction the aldehydes and/or ketones in the feed are condensed to give hydroxy aldehyde, or hydroxy ketone, followed by cleavage of water yielding unsaturated aldehyde or unsaturated ketone with carbon number of at least C5, depending on feed. Feed comprising at least one component selected from the group consisting of saturated or unsaturated aldehydes, ketones, hydroxy aldehydes and mixtures hereof, preferably saturated aldehydes and ketones are used. The reaction is carried out in the presence of homogeneous or heterogeneous aldol condensation catalyst. Supported alkali metal catalysts like Na/SiO$_2$ are suitable heterogeneous catalysts and alkali or alkaline earth metal hydroxides, for instance NaOH, KOH or Ca(OH)$_2$ are suitable homogeneous catalysts. The reaction temperature ranges from 80 to 400° C., preferably lower temperature is used with lower molecular weight feeds and higher temperatures with higher molecular weight feeds. Optionally solvents such as alcohols may be used. The amount of the homogeneous catalyst to be used in the reaction varies from 1 to 20%, preferably from 1.5 to 19%, by weight. Alternatively, reaction conditions of the aldol condensation may be adjusted to yield hydroxyaldehydes such as aldols as the reaction products, thus minimizing oligomerization based on the reaction of double bonds. Branched unsaturated aldehydes or ketones having carbon number of at least C5 are obtained.

Alcohol Condensation

In alcohol condensation reaction, suitably the Guerbet reaction, alcohols in the feed are condensed to substantially increase the carbon number of the hydrocarbon stream, thus yielding branched monofunctional and branched polyfunctional alcohols having carbon number of at least C5 respectively from monohydroxy and polyhydroxy alcohols. Feed comprising primary and/or secondary, saturated and/or unsaturated alcohols, preferably saturated alcohols is subjected to condensation in the presence of basic catalysts of the Guerbet reaction, selected from hydroxides and alkoxides of alkali and alkaline earth metals and metal oxides, in combination with a co-catalyst comprising metal salt. The amount of the basic catalyst varies from 1 to 20%, preferably from 1.5 to 10% by weight. Suitable co-catalysts include salts of chromium(III), manganese(II), iron(II), cobalt(II), lead(II) and palladium, stannic oxide and zinc oxide, the salts being salts soluble in water or alcohols, preferably sulphates and chlorides. The co-catalyst is used in amounts varying between 0.05 and 1%, particularly preferably between 0.1 and 0.5%, by weight. Hydroxides or alkoxides (alcoholates) of alkali metals, together with zinc oxide or palladium chloride serving as the co-catalyst, are preferably used. The reaction is performed at 200-300° C., preferably at 240-260° C., under vapour pressure provided by the alcohols present in the reaction mixture. Water is liberated in the reaction, said water being continuously separated.

Radical Reaction

In the radical reaction, carbon chains of the saturated carboxylic acids in the feed are lengthened with alpha olefins. In the radical reaction step, the feedstock comprising saturated carboxylic acids and alpha olefins in a molar ratio of 1:1 are reacted at 100-300° C., preferably at 130-260° C. under a vapor pressure provided by the reaction mixture, in the presence of an alkyl peroxide, peroxyester, diacylperoxide or peroxyketal catalyst. Alkyl peroxides such as ditertiary butyl peroxide catalysts are preferably used. The amount of the catalyst used in the reaction is from 1 to 20%, preferably from 1.5 to 10%, by weight. A branched carboxylic acid having carbon number of at least C5 is obtained as the reaction product.

Condensation Product

The carbon number of the condensation product depends on the carbon number of the feed molecules as well as the condensation reaction. Typical carbon numbers of condensation products via ketonization are sum of the feed carbon numbers minus one; the carbon numbers of the products via other condensation reactions are sum of the feed carbon numbers. Preferably the feed contains only 1-3 feedstock compounds of different hydrocarbon chain length; that is for example either only C8, or only C10, or only C12, or C8/C10 etc., or C8/C10/C12. etc. The feed for condensation is selected so that the carbon number of the condensation product is from C5 to C28.

Combined Hydrodefunctionalization and Isomerization (CHI)

The above obtained saturated and/or unsaturated condensation product comprising monofunctional and/or polyfunctional compounds having carbon number of at least C5, preferably from C5 to C28, selected from ketones, aldehydes, alcohols and carboxylic acids and corresponding sulphur compounds, corresponding nitrogen compounds and combinations thereof is then subjected to combined hydrodefunctionalization and isomerization step (CHI) in the presence of a bifunctional molecular sieve catalyst comprising an acidic function molecular sieve and a hydrogenation metal on a binder. A binder means here carrier or support.

Catalyst

A preferred catalyst in the combined hydrodefunctionalization and isomerization (CHI) step enables dewaxing by isomerizing n-paraffinic wax molecules to isoparaffins with boiling points in the desired range. In the CHI step a bifunctional molecular sieve catalyst is used. The catalyst comprises a molecular sieve, hydrogenation/dehydrogenation metal and an optional binder.

The molecular sieve is selected from crystalline silicoaluminophosphates and aluminosilicates, preferably comprising framework type selected from AEL, TON, and MTT. The molecular sieve may have one-dimensional channel system, comprising parallel pores without intersecting pores, with pore openings around 4-7 Å, without crossing channels, which induce strong cracking activity. Preferably the crystalline molecular sieves contain at least one 10-ring channel and they are based on aluminosilicates (zeolites), or on silicoaluminophosphates (SAPO). Examples of suitable zeolites containing at least one 10-ring channel include ZSM-11, ZSM-22, ZSM-23, ZSM-48, EU-1 and examples of suitable silicoaluminophosphates containing at least one 10-ring channel include SAPO-11 and SAPO-41. Preferred catalysts include SAPO-11 and ZSM-23. SAPO-11 may be synthetized according to EP 0 985 010. ZSM-23 may be synthetized according to WO 2004/080590.

The molecular sieves are typically composited with binder materials, resistant to high temperatures and suitable for employing under dewaxing conditions to form a finished catalyst, or it may be binderless (self-bound). The binder materials are usually inorganic oxides such as silica, alumina, silica-alumina, and binary combinations of silica with other metal oxides such as titania, magnesia, thoria, zirconia, and the like, and tertiary combinations of these oxides such as silica-alumina-thoria and silica-alumina magnesia. The amount of the molecular sieve in the finished catalyst is from 10 to 100 wt. %, preferably 15 to 80 wt. % based on the catalyst. The rest comprises binder.

Said catalysts are bifunctional, i.e., they are loaded with at least one metal dehydrogenation/hydrogenation component, selected from Group 6 metals of the Periodic Table of Elements, Group 8-10 metals and mixtures thereof. Preferable metals are Groups 9-10 metals. Particularly preferable are Pt, Pd and mixtures thereof. The metal content in the catalyst varies from 0.1 to 30 wt. %, preferably from 0.2 to 20 wt. % based on catalyst. The metal component may be loaded using any suitable known methods, such as ion exchange and impregnation methods using decomposable metal salts.

Process Conditions

The condensed product is subjected to the combined hydrodefunctionalization and isomerization step under a pressure ranging from 0.1 to 15 MPa, preferably from 1 to 10 MPa, and particularly preferably from 2 to 8 MPa, at a temperature ranging between 100 and 500° C., preferably between 200 and 400° C., and particularly preferably between 300 and 400° C., the flow rate WHSV being between 0.1 and 10 l/h, preferably between 0.1 to 5 l/h, and particularly preferably between 0.1 and 2 l/h, the hydrogen to liquid feed ratio being between 1 and 5000 Nl/l (normal liter per liter), preferably between 10 to 2000 Nl/l, and particularly preferably between 100 and 1300 Nl/l, in the presence of the above described bifunctional molecular sieve catalyst. A fixed catalyst bed reactor, for instance the trickle-bed reactor is suitable for the reaction.

Hydrofinishing

Optionally the product obtained from the CHI step may be subjected to hydrofinishing in order to adjust product qualities to desired specifications. Hydrofinishing is a form of mild hydrotreating directed to saturating any olefins as well as to removing any remaining heteroatoms and colour bodies. Suitably the hydrofinishing is carried out in cascade with the previous step. Typically the hydrofinishing is carried out at temperatures ranging from about 150° C. to 350° C., preferably from 180° C. to 250° C. in the presence of a hydrofinishing catalyst. Total pressures are typically from 3 to 20 MPa (about 400 to 3000 psig). Weight hourly space velocity (WHSV) is typically from 0.1 to 5 l/h, preferably 0.5 to 3 l/h and hydrogen treat gas rates of from 1 to 2000 Nl/l.

Hydrofinishing catalysts are suitably supported catalysts containing at least one metal selected from Group 6 metals of the Periodic Table of Elements, Groups 8-10 metals and mixtures thereof. Preferred metals include noble metals having a strong hydrogenation function, especially platinum, palladium and mixtures thereof. Mixtures of metals may also be present as bulk metal catalysts wherein the amount of metal is 30 wt. % or greater based on catalyst. Suitable supports include low acidic metal oxides such as silica, alumina, silica-alumina or titania, preferably alumina.

After optional finishing, the product is passed to a distillation and/or separation unit in which product components boiling over different temperature range and/or product components intended for different applications are separated from each other.

Product

The process according to the invention yields a branched and paraffinic hydrocarbon product, particularly suitable for diesel fuel, kerosene and gasoline pool, comprising saturated branched hydrocarbons typically having carbon number from C5 to C28. The product is produced from feed of biological origin by methods resulting in the lengthening of the carbon chain of the starting material molecules to levels necessary for diesel fuel, kerosene or gasoline (>C5).

The product contains typically some short carbon-carbon side branches. For diesel fuel the branched structure results in an exceptionally low cloud point and cold filter plugging point but still a good cetane number compared to the products obtained by the known methods. In Table 2 properties of the biodiesel product produced with the process according to the invention (1) are compared to those obtained by processes according to the state of the art (2-6). All products are 100% diesel components.

TABLE 2

Properties of diesel fuels

| Property | Product 1 | Product 2 | Product 3 | Product 4 | Product 5 | Product 6 |
| --- | --- | --- | --- | --- | --- | --- |
| kV40 mm²/s | 2.4-4.4 | 2.9-3.5 | 4.5 | 3.2-4.5 | 2.0-4.5 | 1.2-4.0 |
| Cloud point ° C. | −5--37 | −5--30 | −5 | 0--25 | | −10--34 |
| Flash point PMcc, ° C. | | 52-65 | | | ≧55 | |
| Cold filter plug point, ° C. | −15--45 | −15--19 | | | ≦+5--20 | ≦−20--44 |
| IQT cetane number | 77-84 | 84-99 | 51 | 73-81 | ≧51 | ≧51 |
| Sulfur ppm | <10 | <10 | <10 | <10 | <10 | <10 |
| Density 15° C. kg/m³ | 779-782 | 775-785 | 885 | 770-785 | 820-845 | 800-840 |
| Dist. 10% | 190-220 | 260-270 | 340 | 260 | | 180 |
| 90% | 321-343 | 295-300 | 355 | 325-330 | | |
| 95% | 341-357 | | | | 360 | 340 |

The products of Table 2 are prepared as follows:

(1) is prepared by the method according to the invention, by condensation and combined hydrodefunctionalization and isomerization of fatty acids (2) is synthetic biodiesel prepared by hydrodeoxygenation and hydroisomerisation of triglycerides according to FI 100248

(3) is fatty acid methyl ester biodiesel prepared by transesterification of rape seed oil (BioDiesel)

(4) is natural gas based diesel fuel prepared by gas to liquid and hydroisomerisation processes (GTL diesel)

(5) and (6) are specifications for mineral oil based diesel fuels with different specifications for use in the arctic conditions.

The branched structure of the product obtained according to the present invention results in low freezing point because of the absence of crystalline waxes, particularly suitable also as kerosene fuel component.

The branched, saturated hydrocarbon product contains paraffins more than 80 vol-%, preferably more than 99 vol-%.

The branched, saturated hydrocarbon product contains n-paraffins less than 30 wt-%, preferably less than 15 wt-%.

The branched, saturated hydrocarbon product contains aromatics less than 20 vol-%, preferably less than 10 vol-%, according to method IP-391.

The obtained branched, saturated hydrocarbon product, based on biological starting materials, contains carbon $^{14}C$ isotope, which may be considered as an indication of the use of renewable raw materials. Typical $^{14}C$ isotope content (proportion) of the total carbon content in the product, which is completely of biological origin, is at least 100%. Carbon $^{14}C$ isotope content is determined on the basis of radioactive carbon (carbon $^{14}C$ isotope) content in the atmosphere in 1950 (ASTM D 6866).

Advantages

The process according to the invention has several advantages. The product originates from feedstock based on renewable natural resources. Starting materials of the process of the invention are available all over the world, and moreover, the utilization of the process is not limited by significant initial investments in contrast for instance to the GTL technology where Fischer-Tropsch waxes are produced.

The process of the invention comprises a combination of a condensation reaction step with a combined hydrodefunctionalization and isomerization step (CHI). When compared to the technically available processes, the combined process of the invention is an economic and efficient way of producing diesel fuels, kerosenes and gasolines from renewable sources.

In the CHI step with oxygen, nitrogen or sulphur containing feeds the cracking of isomerized hydrocarbons is significantly suppressed and the yields are improved when compared to hydrodefunctionalization and isomerization steps performed separately.

The process according to the invention utilizes renewable starting materials of biological origin containing heteroatoms, particularly for producing diesel fuel, kerosene and gasoline components. In addition to traditional crude oil or synthesis gas feeds, a completely new and renewable raw material source for high-quality branched paraffinic fuels is now provided.

The obtained products are carbon dioxide neutral with respect to the use and disposal thereof, that is, they will not increase the carbon dioxide load of the atmosphere in contrast to products derived from fossil starting materials.

With the process, a branched, saturated hydrocarbon product suitable for biofuel component is obtained from renewable sources. These branched, saturated hydrocarbons can be used as gasoline, kerosene or diesel fuel compounds.

Due to the absence of unsaturation in the hydrocarbon product, the oxidation and thermal stabilities are good and the tendency for polymerisation low. In polymerisation gum like deposits are formed and they may deposit on fuel filters, disrupt injection nozzle and make deposit on heat exchangers and engine systems.

Combustion characteristics of nonaromatic and low naphtenic branched hydrocarbon according to the invention is good, and therefore smoke formation is minimised.

Branching in the paraffinic carbon chain enhances low temperature properties, such as freezing point, cloud point, pour point and cold-filter plugging point. The extremely good low temperature properties make it possible to use the branched, saturated hydrocarbon product as diesel fuel or diesel fuel component also in arctic fuels.

The branched, saturated hydrocarbon compound manufactured according to the invention is particularly designed for use in compression-ignition engines, where air is compressed until it is heated above the auto-ignition temperature of diesel fuel and then the fuel is injected as a high pressure spray, keeping the fuel-air mix within the flammable limits of diesel. Because there is no ignition source, a high cetane number and a low auto-ignition temperature are required of the diesel fuel.

Due to saturation and long paraffinic chain length, the cetane number of the branched, saturated hydrocarbon product is high, thus making the product suitable as cetane number improver. The cetane number gauges the ease with which the diesel fuel will auto-ignite when compressed. Higher cetane numbers indicate easier self-ignition and better engine operation.

The high flash point of the branched, saturated diesel fuel product is important primarily from a fuel-handling standpoint. In the ethanol/mineral oil diesel or ethanol/plant oil diesel micro-emulsions, the flash point is remarkably lower. A too low flash point will cause fuel to be a fire hazard, subject to flashing, and possible continued ignition and explosion.

Because of the natural fatty acid based raw materials, the branched, saturated hydrocarbon product contains no sulphur. Thus, in the pre-treatment of exhaust gas the catalysts and particulate filters can easily be adjusted to the sulphur-free hydrocarbon compound according to invention. Catalyst poisoning is reduced and catalyst service lifetime is significantly prolonged.

Even though the branched, saturated hydrocarbon product is produced from natural fatty acid based raw materials it contains no oxygen and thus the nitrogen oxide ($NO_x$) emissions are much lower than those of conventional biodiesel fuels.

The composition of the branched, saturated hydrocarbon product produced according the invention resembles highly those of conventional diesel fuels, thus it can be used in compression-ignition (diesel) engines with no modifications, which is not the case with fatty acid methyl ester based bio-diesel compounds.

The branched, saturated hydrocarbon product can be blended at any level with petroleum diesel and with fatty acid methyl ester based bio-diesel compounds. The latter may be advantageous if the lubricity of the product needs to be enhanced.

A nonpolar and fully saturated hydrocarbon component, free of sulphur and other heteroatoms of the feedstock, is obtained in the combined hydrodefunctionization and isomerization (CHI) step. In the CHI step, the carbon chain is branched, thus improving low temperature properties, that is, the pour point is lowered, low-temperature fluidity enhanced and filterability at low temperatures is improved. Solid wax is converted to oily saturated hydrocarbon product, suitable as diesel fuel, gasoline or kerosene particularly at arctic conditions.

Ethanol is most commonly used to power automobiles, though it may be used to power other vehicles, such as farm tractors and airplanes. Ethanol (E100) consumption in an engine is approximately 34% higher than that of gasoline, because the energy per volume unit is 34% lower. The fuel consumption by the biogasoline compound of the invention in therefore less than that of ethanol based biofuel.

The products according to the invention can be blended to motor fuels in much higher proportions than Bio-Ethanol or RME. Therefore the need for 5.75% minimum proportion of biofuels in all gasoline and diesel fuels is easily fulfilled.

The invention is illustrated in the following examples presenting some preferable embodiments of the invention. However, it is evident to a person skilled in the art that the scope of the invention is not meant to be limited to these examples only.

EXAMPLE 1

Preparation of Fuel Components from Fatty Acids Derived from Palm Oil

Palm oil was hydrolyzed. Double bonds of the fatty acids derived from palm oil feedstock were selectively prehydrogenated, and the saturated fatty acids were continuously ketonised at atmospheric pressure, in a tubular reactor using a $MnO_2$ catalyst. Temperature of the reactor was 370° C., the weight hourly space velocity (WHSV) of total feed being about 0.8 l/h. A mixture of saturated ketones having carbon chain lengths of $C_{31}$, $C_{33}$ and $C_{35}$ was obtained as the product.

The above obtained feed comprising ketones was then subjected to combined hydrodefunctionalization and isomerization. Feed compound C35 ketone contains about 3.16 wt. % oxygen, compound C33 ketone 3.34 wt. % oxygen and compound C31 ketone 3.55 wt. % oxygen. Thus palm ketone contains about 3.4 wt. % oxygen. The catalyst employed in the combined step was Pt/SAPO-11 on alumina binder. The process was carried out at a temperature of 365° C. and under a pressure of 4 MPa, using $H_2$/HC ratio of 1250 Nl/l and WHSV of 0.8 l/h. The gas/gasoline/kerosene fraction was condensed from hydrogen flow. Diesel, process oil (356-413° C.) and base oil (>413° C.) were distilled to separate fractions under reduced pressure. The process conditions and product distribution are presented in Table 3. Hydrocarbon distribution is calculated from the organic phase, and water is calculated from the palm fatty acid ketone feed.

TABLE 3

Process conditions in CHI and product distribution

| Catalyst | Reactor T, P | $H_2$/HC | WHSV |
|---|---|---|---|
| Pt/SAPO-11 | 365° C., 4 MPa | 1250 | 0.8 |

| Gas $C_{1-4}$ | Gasoline $C_{5-10}$ | Diesel $C_{11-20}$ | Process oil $C_{21-26}$ | Base oil >$C_{26}$ | $H_2O$ |
|---|---|---|---|---|---|
| 7.8% | 3.5% | 28.2% | 10.7% | 49.7% | 3.4% |

The fuel products contain mainly branched isoparaffins suitable for gasoline, kerosene and diesel pool. The physical properties of produced kerosene or gasoline faction are presented in Table 8 and the physical properties of produced diesel fractions are presented in Table 9.

EXAMPLE 2

Preparation of Fuel Components from C16 Alcohol Derived from Palm Oil 200 g of primary saturated C16 fatty alcohol (hexadecanol), palladium chloride (5 ppm palladium) and 12 g of sodium methoxylate were put in a Parr reactor. Mixing was adjusted to 250 rpm, temperature to 250° C. and pressure to 0.5 MPa. Slight nitrogen purge was maintained to sweep out water liberated in reaction. The condensation reaction was carried out until the amount of condensed alcohol was stabilized in GC analysis. After reaction the product was neutralized with hydrochloric acid, washed with water and dried with calcium chloride. Condensed C32 alcohol was obtained as reaction product.

The above obtained feed comprising branched $C_{32}$ alcohol, 2-tetradecyl-oktadecanol was subjected to combined hydrodefunctionalization and isomerization. Feed C32 alcohol contains about 3.43 wt. % oxygen. The catalyst employed in the CHI was Pt/ZSM-23 on alumina binder. The process was carried at a temperature of 366° C. and under a pressure of 4.2 MPa, using $H_2$/HC ratio of 2000 Nl/l and WHSV 0.5 l/h. The gas/gasoline/kerosene fraction was condensed from hydrogen flow. Diesel, process oil (356-413° C.) and base oil (>413° C.) were distilled to separate fractions under reduced pressure. The process conditions and product distribution are presented in Table 4.

TABLE 4

Process conditions in CHI and product distribution

| Catalyst | Reactor T, P | $H_2$/HC | WHSV |
|---|---|---|---|
| Pt/ZSM23 | 366° C., 4.2 MPa | 2000 | 0.5 |

| Gas $C_{1-4}$ | Gasoline $C_{5-10}$ | Diesel $C_{11-20}$ | Process oil $C_{21-26}$ | Base oil >$C_{26}$ | $H_2O$ |
|---|---|---|---|---|---|
| 13.5% | 5.5% | 27.1% | 18.6% | 35.2% | 3.4% |

The fuel products contain mainly branched isoparaffins suitable for gasoline, kerosene and diesel pool. The physical properties of produced kerosene or gasoline faction are presented in Table 8 and the physical properties of produced diesel fractions are presented in Table 9.

EXAMPLE 3

Preparation of Fuel Components from Unsaturated Fatty Acids Derived from Palm Oil The free fatty acids were distilled from palm oil (PFAD). The feed containing both saturated and unsaturated fatty acids was continuously ketonised at atmospheric pressure, in a tubular reactor using a $MnO_2$ catalyst. Temperature of the reactor was 370° C., the weight hourly space velocity (WHSV) of total feed being about 0.6 l/h. A mixture of both saturated and unsaturated ketones having carbon chain lengths of $C_{31}$, $C_{33}$ and $C_{35}$ was obtained as the product.

The above obtained feed comprising ketones was subjected to combined hydrodefunctionalization and isomerization. Feed compound C35 ketone contains about 3.16 wt. % oxygen, compound C33 ketone 3.34 wt. % oxygen and compound C31 ketone 3.55 wt. % oxygen. Thus unsaturated palm ketone contains about 3.4 wt. % oxygen. The process was carried out in the presence of Pt/SAPO-11 catalyst on alumina binder at a temperature of 356° C. and under a pressure of 3.9 MPa, using $H_2$/HC ratio of 2000 Nl/l and WHSV 0.5 l/h. The gas/gasoline/kerosene fraction was condensed from hydrogen flow. Diesel, process oil (356-413° C.) and base oil (>413° C.) were distilled to separate fractions under reduced pressure. The process conditions and product distribution are presented in Table 5.

TABLE 5

Process conditions in CHI and product distribution

| Catalyst | Reactor T, P | $H_2$/HC | WHSV |
|---|---|---|---|
| Pt/SAPO-11 | 356° C., 3.9 MPa | 2000 | 0.5 |

| Gas $C_{1-4}$ | Gasoline $C_{5-10}$ | Diesel $C_{11-20}$ | Process oil $C_{21-28}$ | Base oil >$C_{28}$ | $H_2O$ |
|---|---|---|---|---|---|
| 3.9% | 3.5% | 25.4% | 12.0% | 55.2% | 3.4% |

The fuel products contain mainly branched isoparaffins suitable for gasoline, kerosene and diesel pool. The physical properties of produced kerosene or gasoline faction are presented in Table 8 and the physical properties of produced diesel fractions are presented in Table 9.

EXAMPLE 4

Preparation of Fuel Components from Stearic Acid Fraction ($C_{17}H_{35}COOH$)

A mixture of plant oils (linseed, soybean, and rapeseed oils) was pretreated by hydrolysis and distillation to obtain fatty acid fractions according to carbon numbers. Double bonds of the C18 acid fraction were selectively prehydrogenated, and the stearic acid was continuously ketonised at atmospheric pressure, in a tubular reactor using a $MnO_2$ on alumina catalyst. Temperature of the reactor was 360° C., the WHSV of the feed being 0.9 l/h. Saturated $C_{35}$ ketone with 12 wt. % unconverted stearic acid was obtained as the product.

A mixture of ketone having carbon chain length of $C_{35}$ with 12 wt. % of residual stearic acid was obtained by incomplete conversion in ketonization. Ketonisation was performed as described in above. The feed was subjected to combined hydrodefunctionalization and isomerization to test the influence of fatty acid to isomerization. C35 ketone contains about 3.16 wt. % oxygen, and stearic acid contains 11.25 wt. % oxygen, thus the feed contains totally 4.1 wt. % oxygen. The catalyst employed in the combined step was Pt/ZSM-23 on alumina binder. The CHI process was carried out at a temperature of 363° C. and under a pressure of 4.0 MPa, using $H_2$/HC ratio of 2000 Nl/l and WHSV 0.5 l/h. The gas/gasoline/kerosene fraction was condensed from hydrogen flow. Diesel, process oil (356-413° C.) and base oil (>413° C.) were distilled to separate fractions under reduced pressure. The process conditions and product distribution are presented in Table 6. Hydrocarbon distribution is calculated from organic phase, and water is calculated from fed ketone and fatty acid.

TABLE 6

Process conditions in CHI and product distribution

| Catalyst | Reactor T, P | H2/HC | WHSV |
|---|---|---|---|
| Pt/ZSM23 | 363° C., 4.0 MPa | 2000 | 0.5 |

| Gas $C_{1-4}$ | Gasoline $C_{5-10}$ | Diesel $C_{11-20}$ | Process oil $C_{21-28}$ | Base oil >$C_{28}$ | $H_2O$ |
|---|---|---|---|---|---|
| 6.2% | 4.0% | 37.8% | 9.0% | 43.1% | 4.1% |

The fuel products contain mainly branched isoparaffins suitable for gasoline, kerosene and diesel pool. The physical properties of produced kerosene or gasoline faction are presented in Table 8 and the physical properties of produced diesel fractions are presented in Table 9.

EXAMPLE 5

Preparation of Fuel Components from Fatty Acids Derived from Palm Oil

Palm oil was hydrolyzed. Double bonds of the fatty acids derived from palm oil feedstock were selectively prehydrogenated, and the saturated fatty acids were continuously ketonised at atmospheric pressure, in a tubular reactor using a $MnO_2$ catalyst. Temperature of the reactor was 370° C., the weight hourly space velocity (WHSV) of total feed being about 0.8 l/h. A mixture of saturated ketones having carbon chain lengths of $C_{31}$, $C_{33}$ and $C_{35}$ was obtained as the product.

Feed obtained by ketonization according the above process was subjected to combined hydrodefunctionalization and isomerization. Feed compound C35 ketone contains about 3.16 wt. % oxygen, compound C33 ketone 3.34 wt. % oxygen and compound C31 ketone 3.55 wt. % oxygen. Thus palm ketone contains about 3.4 wt. % oxygen. The CHI step was carried out in the presence of a Pt/ZSM-23 catalyst on alumina binder, at a temperature of 345° C. and under a pressure of 4 MPa, using hydrogen to hydrocarbon ($H_2$/HC) ratio of 950 Nl/l and weight hourly space velocity (WHSV) of 1.1 l/h. The gas/gasoline, diesel, process oil (356-413° C.) and base oil (>413° C.) fractions were all distilled as separated fractions under reduced pressure. The process conditions and product distribution are presented in Table 7. Hydrocarbon (HC) distribution is calculated from the organic product phase, and water is calculated from the palm ketone feed.

TABLE 7

Process conditions in CHI step and product distribution

| Catalyst | Reactor T, P | $H_2$/HC | WHSV |
|---|---|---|---|
| Pt/HZSM-23 | 345° C., 4 MPa | 950 | 1.1 |

| Gas $C_{1-4}$ | Gasoline $C_{5-10}$ | Diesel $C_{11-20}$ | Process oil $C_{21-26}$ | Base oil heavier fraction >$C_{26}$ | $H_2O$ |
|---|---|---|---|---|---|
| 20.9% | 15.4% | 20.5% | 7.0% | 36.2% | 3.4% |

The physical properties of produced gasoline faction are presented in Table 8 and the physical properties of produced diesel fractions are presented in Table 9.

The fuel products contain mainly branched isoparaffins suitable for gasoline, kerosene and diesel pool. The catalyst selected for CHI in example 5 produces the highest yield of fuel components when compared to examples 1-4.

TABLE 8

Gasoline produced according to the invention

| Method | Analysis | Example 1 | Example 2 | Example 3 | Example 4 | Example 5 |
|---|---|---|---|---|---|---|
| EN ISO 12185 | Density@15° C., kg/m3 | 747 | 738 | 743 | 747 | 713 |
| ASTM D 3120 | S, mg/kg | 1 | 1 | 1 | <1 | 1.8 |
| ASTM D 2887 | 10%, ° C. | 144 (C9) | 123 (C8) | 136 (C8) | 139 (C8) | 98 (C7) |
| | 90%, ° C. | 255 | 230 | 235 | 234 | 190 |
| | 95%, ° C. | 272 (C15) | 247 (C14) | 260 (C14) | 274 (C15) | 209 (C11) |

TABLE 8-continued

Gasoline produced according to the invention

| Method | Analysis | Example 1 | Example 2 | Example 3 | Example 4 | Example 5 |
|---|---|---|---|---|---|---|
| GC-PIONA wt.-% | Paraffins | 96.19 | 97.4 | 92.59 | 89.19 | 97.7 |
| | n-Paraffines | 14.8 | 18.3 | 20.1 | 20.9 | 24.2 |
| | i-Paraffines | 81.4 | 79.1 | 72.5 | 68.3 | 73.4 |
| | Olefines | 0.1 | 0.1 | 0.0 | 0.1 | 0.0 |
| | p-Naphtenes | 2.8 | 1.6 | 6.0 | 7.1 | 2.2 |
| | o-Naphtenes | 0.1 | 0.3 | 1.0 | 1.8 | 0.0 |
| | Aromatics | 0.8 | 0.6 | 0.4 | 1.8 | 0.1 |
| | Oxygenates | 0.0 | 0.0 | 0.0 | 0.0 | 0.0 |
| | Sulphur compounds | 0.0 | 0.0 | 0.0 | 0.0 | 0.0 |
| ENISO 7536 | Oxidation Stability, min | >1500 | | | | >1500 |

In examples 1-4 the lighter cut is condensed from hydrogen feed in normal pressure, and in example 5 it is distilled from total liquid product. It was surprisingly found that the branched saturated hydrocarbons especially in condensed phase are suitable as kerosene compounds and that diesel fractions obtained by the process of invention have extremely good cold properties. In all examples the cutting points of different fractions may be varied, therefore in addition to gasoline and diesel fractions also kerosene may be produced.

TABLE 9

Diesel fuels produced according to the invention

| Method | Analysis | Example 1 | Example 2 | Example 3 | Example 4 | Example 5 |
|---|---|---|---|---|---|---|
| ENISO 12185 | Density@ 15° C., kg/m3 | 782 | 780 | 780 | 782 | 745 |
| ASTM D 445 | kV40, cSt | 3.0 | 2.8 | 2.4 | 2.5 | 2.5 |
| ASTM D 5773/ D5771 | Cloud Point, ° C. | −37 | −35 | −36 | −36 | −45 |
| EN 116 | Cold Filter Plug Point, ° C. | −44 | <−45 | −45 | −39 | <−45 |
| | IQT cetane number | 77 | 77 | 83 | 84 | 79 |
| ASTM D 2887 | 10%, ° C. | 221 | 210 | 189 | 190 | 202 |
| | 90%, ° C. | 343 | 338 | 336 | 321 | 342 |
| | 95%, ° C. | 357 | 351 | 352 | 341 | 351 |
| EN 12916 | Mono-aromatics % | 1.1 | 0.8 | 0.9 | 2.0 | 0.1 |
| | Diaromatics % | 0.2 | 0.2 | <0.1 | 0.4 | <0.1 |
| | Triaromatics % | <0.10 | <0.10 | <0.10 | <0.10 | <0.02 |
| | Arom Di + Tri | 0.3 | 0.2 | <0.1 | 0.4 | 0.0 |
| ASTM D 3120 | S, mg/kg | <1 | <1 | <1 | <1 | <1 |

In all examples the cutting points of different fractions may be varied, therefore for example kerosene is obtained as middle cut between gasoline and diesel fractions.

The invention claimed is:

1. A process for producing saturated C5-C28 hydrocarbons, characterized in that the process comprises the steps where feedstock having a total carbon number of 1 to 14 selected from ketones, aldehydes, alcohols, carboxylic acids, esters of carboxylic acids and anhydrides of carboxylic acids, alpha olefins, metal salts of carboxylic acids, and corresponding sulphur compounds, corresponding nitrogen compounds and combinations thereof, derived from starting material of biological origin, is subjected to a condensation step and subsequently subjected to a combined hydrodefunctionalization and isomerization step thereby producing a product selected from the group consisting of diesel fuel, kerosene, and gasoline.

2. The process according to claim 1, characterized in that the condensation step is selected from ketonization, aldol condensation, alcohol condensation and radical reactions.

3. The process according to claim 2, characterized in that the ketonization is carried out under the pressure from 0 to 10 MPa, at the temperature from 10 to 500° C., in the presence of supported metal oxide catalyst and the feedstock is selected from fatty acid esters, fatty acid anhydrides, fatty alcohols, fatty aldehydes, natural waxes, metal salts of fatty acids, dicarboxylic acids and polyols.

4. The process according to claim 3, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

5. The process according to claim 2, characterized in that the aldol condensation in the presence of a homogeneous or heterogeneous aldol condensation catalyst at a temperature from 80 to 400° C. and the feedstock is selected from aldehydes, ketones and hydroxy aldehydes.

6. The process according to claim 5, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

7. The process according to claim 2, characterized in that the alcohol condensation is carried out in the presence of a catalyst selected from hydroxides and alkoxides of alkali and alkaline earth metals and metal oxides, in combination with a co-catalyst comprising a metal at a temperature from 200 to 300° C. and the feedstock is selected from primary and/or secondary, saturated and/or unsaturated alcohols.

8. The process according to claim 7, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

9. The process according to claim 2, characterized in that the radical reaction is carried out at 100 to 300° C. temperature in the presence of an alkyl peroxide, peroxyester, diacylperoxide or peroxyketal catalyst and the feedstock is selected from saturated carboxylic acids and alpha olefins in a molar ratio of 1:1.

10. The process according to claim 9, characterized in that in the combined hydrodefunctionalization and isomerization step the flow rate WHSV is from 0.1 to 10 $h^{-1}$ and hydrogen to liquid feed ratio is from 1 to 5000 Nl/l.

11. The process according to claim 9, characterized in that after the combined hydrodefunctionalization and isomerization step an optional hydrofinishing step is carried out, and the product is passed to a distillation and/or separation unit in which product components boiling over different temperature range are separated from each other.

12. The process according to claim 9, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

13. The process according to claim 2, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

14. The process according to claim 1, characterized in that the combined hydrodefunctionalization and isomerization step is carried out under pressure from 0.1 to 15 MPa, at the temperature from 100 to 500° C., in the presence of a bifunctional catalyst comprising at least one molecular sieve selected from aluminosilicates and silicoaluminophosphates and at least one metal selected from Group 6 and 8-10 metals of the Periodic Table of Elements.

15. The process according to claim 14, characterized in that the bifunctional catalyst comprises at least one molecular sieve selected from zeolites and silicoaluminophosphates, at least one metal selected from Group 9 or 10 metals of the Periodic Table of Elements and a binder.

16. The process according to claim 1, characterized in that the feedstock is selected from the group consisting of:
  a. plant fats, plant oils, plant waxes; animal fats, animal oils, animal waxes, fish fats, fish oils, fish waxes, and
  b. fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis, and
  c. esters obtained from plant fats, plant oils, plant waxes; animal fats, animal oils, animal waxes; fish fats, fish oils, fish waxes, and mixtures thereof by transesterification, and
  d. metal salts of fatty acids obtained from plant fats, plant oils, plant waxes; animal fats, animal oils, animal waxes; fish fats, fish oils, fish waxes, and mixtures thereof by saponification, and
  e. anhydrides of fatty acids from plant fats, plant oils, plant waxes; animal fats, animal oils, animal waxes; fish fats, fish oils, fish waxes, and mixtures thereof, and
  f. esters obtained by esterification of free fatty acids of plant, animal and fish origin with alcohols, and
  g. fatty alcohols or aldehydes obtained as reduction products of fatty acids from plant fats, plant oils, plant waxes; animal fats, animal oils, animal waxes; fish fats, fish oils, fish waxes, and mixtures thereof, and
  h. recycled food grade fats and oils, and fats, oils and waxes obtained by genetic engineering,
  i. dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds, and
  j. mixtures of said starting materials.

17. The process according to claim 1, characterized in that gasoline is obtained as the product.

* * * * *